July 7, 1953  A. W. LO  2,644,895
MONOSTABLE TRANSISTOR TRIGGERED CIRCUITS
Filed July 1, 1952  3 Sheets-Sheet 1

INVENTOR
Arthur W. Lo
BY
ATTORNEY

July 7, 1953  A. W. LO  2,644,895
MONOSTABLE TRANSISTOR TRIGGERED CIRCUITS
Filed July 1, 1952  3 Sheets-Sheet 2

INVENTOR
Arthur W. Lo
BY
ATTORNEY

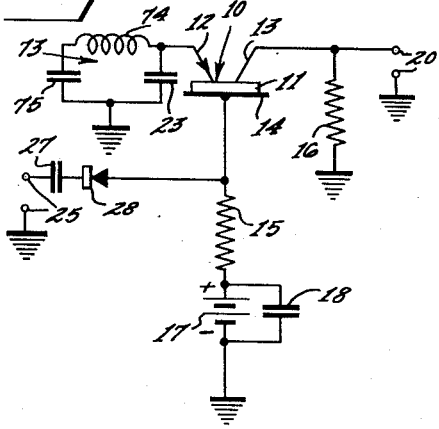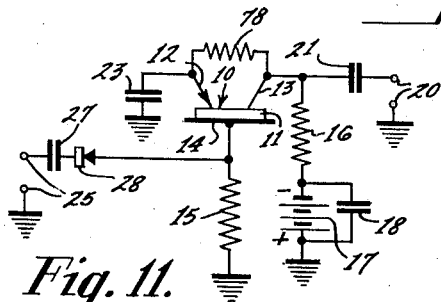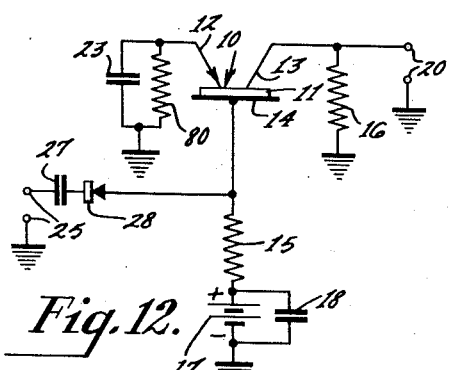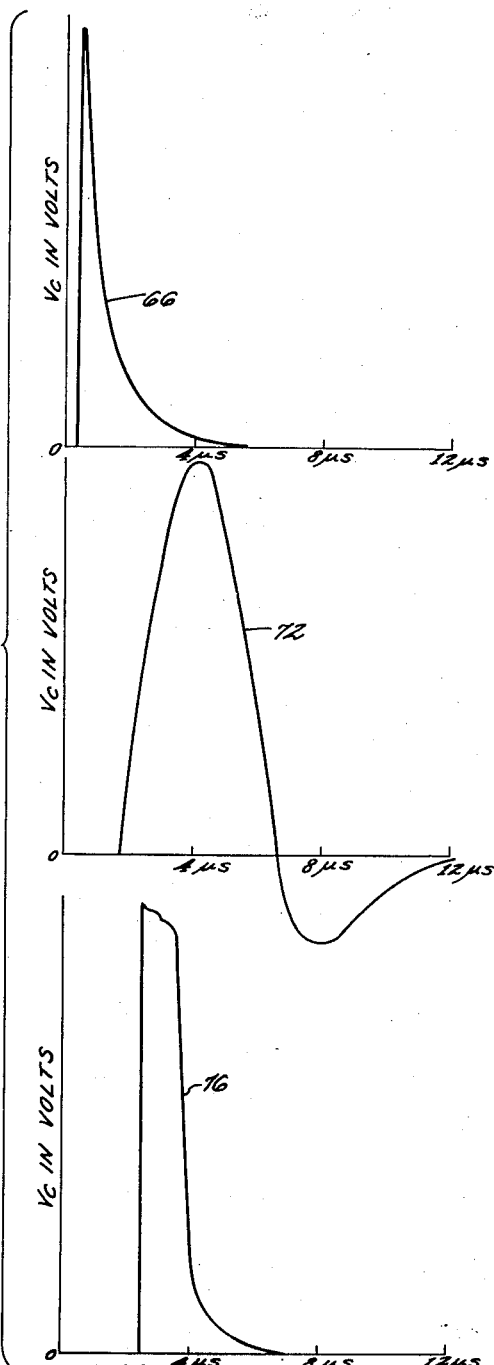

Patented July 7, 1953

2,644,895

UNITED STATES PATENT OFFICE 2,644,895

MONOSTABLE TRANSISTOR TRIGGERED CIRCUITS

Arthur W. Lo, Haddonfield, N. J., assignor to Radio Corporation of America, a corporation of Delaware Application July 1, 1952, Serial No. 296,586

19 Claims. (Cl. 307—88)

This invention relates generally to triggered circuits, and particularly relates to monostable transistor circuits of the type employing single current-multiplication transistors.

Various transistor circuits are known which employ a single current-multiplication transistor to provide either monostable or bistable triggered circuits. A bistable circuit of this type is disclosed and claimed in the patent to Eberhard 2,533,001. The patent to Rack 2,579,336 discloses and claims a stabilized transistor triggered circuit which may be either monostable or bistable.

The latter patent indicates that available transistors exhibit considerable differences in their characteristics such, for example, as the emitter current vs. emitter voltage characteristic. Many of the prior art transistor triggered circuits require adjustment of the circuit constants to compensate for the different characteristics of each individual transistor. The Rack circuit is intended to overcome this defect by providing substantially zero resistance in the external base circuit during its low current conduction state which, in turn, tends to cause the emitter current-emitter voltage curve to pass through the origin of the coordinates. However, this circuit is comparatively complicated and may still require adjustment of the circuit constants to compensate the differences of the characteristics of individual transistors.

In a copending application of A. W. Lo and R. P. Moore, Jr., Serial No. 296,585 filed July 1, 1952, entitled "Monostable Transistor Circuits" and filed concurrently herewith, there is disclosed and claimed a transistor circuit which is effective to overcome the drawbacks of prior art triggered circuits. In particular, the Lo-Moore transistor circuit does not require adjustment of the circuit constants to compensate for differences of the characteristics of individual transistors. However, the transistor triggered circuit disclosed in the copending application above referred to requires a source of trigger pulses having a comparatively low resistance because the pulse source forms part of the emitter circuit.

It is a principal object of the present invention to provide improved monostable triggered circuits employing a current-multiplication transistor.

A further object of the invention is to provide a monostable transistor circuit wherein the source of the trigger pulses need not have a low resistance and which will reshape and amplify the trigger pulses.

Another object of the invention is to provide a monostable triggered circuit of the type referred to, which will develop an output pulse of predetermined amplitude and width in response to a trigger pulse and where the leading edge of the output pulse may be delayed with respect to that of the trigger pulse.

A monostable trigger circuit in accordance with the present invention comprises a current-multiplication transistor. An external network interconnects the transistor electrodes with a common junction point such as ground and includes a base impedance element and a collector impedance element which serves as the output load. A suitable source of voltage such as a battery is provided in series with the base and collector impedance elements to bias the collector in the reverse direction with respect to the base. The base impedance element may be a resistor and provides for regeneration as explained in the Eberhard patent referred to.

In accordance with the present invention, the emitter is connected to the common junction point through suitable capacitive means, such as a capacitor. The source of trigger pulses is coupled across the base impedance element. Accordingly, the emitter circuit is substantially open-circuited during the stable state of operation which corresponds to low collector current. Since the emitter circuit is open-circuited, there is substantially zero emitter current flow. By applying a trigger pulse across the base impedance element, the circuit is triggered into high conduction and the circuit is temporarily carried into its regenerative or unstable state. This unstable state will exist for a period of time determined by the capacitance of the emitter capacitor, and during this time an output pulse is developed across the collector or load impedance element.

Preferably, the source of trigger pulses is coupled to the base resistor through a crystal rectifier so that the source is disconnected from the transistor until a trigger pulse is applied. Furthermore, a crystal rectifier may be connected directly between emitter and base and this rectifier is poled to be rendered conducting when a reverse voltage exists between emitter and base. The provision of a crystal rectifier between emitter and base will reduce the time required to condition the circuit to be triggered by a succeeding pulse. It is also feasible to provide an inductive output load thereby to delay the leading edge of the output pulse with respect to that of the trigger pulse. Various other modifications of the triggered circuit of the invention are feasible which will be explained more in detail hereinafter.

The novel features that are considered characteristic of this invention are set forth with particularity in the appended claims. The invention itself, however, both as to its organization and method of operation as well as additional objects and advantages thereof, will best be understood from the following description when read in connection with the accompanying drawings, in which:

Figures 7–9 are circuit diagrams of modified monostable transistor circuits embodying the invention which permit control of the wave shape of the output pulse and of its direct current level;

Figure 10 is a graph illustrating output voltage as a function of time derived from the circuits of Figures 7 and 9 respectively; and Figures 11 and 12 are circuit diagrams of monostable transistor circuits in accordance with the invention wherein the emitter is current biased to increase the stability of the circuit and to discriminate against undesired or spurious signals.

Figure 1:
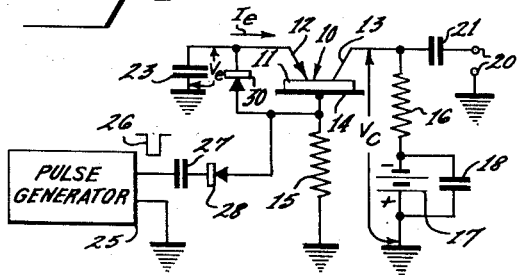
Figure 1 is a circuit diagram of a monostable triggered circuit embodying the present invention.

Referring now to the drawings in which like elements are designated by the same reference characters throughout the figures and particularly to Figure 1, there is illustrated a monostable triggered circuit including a transistor 10. Transistor 10 should be a current-multiplication transistor and may, for example, be a point contact transistor, that is, a transistor of the type where the emitter and collector electrodes are both in rectifying contact with the semi-conducting body 11. A current-multiplication transistor may be defined as a transistor where the short-circuit collector current increments are larger than corresponding emitter current increments. The body 11 may consist of a semi-conducting material such as germanium and preferably is of the N type as will be assumed in the following discussion. Emitter 12, collector 13 and base 14 are in contact with body 11. The details of manufacture and the mode of operation of a point contact transistor are well known and need not be further described here.

Base resistor 15 is connected between base 14 and ground. Collector resistor 16 is connected between collector 13 and a suitable source of voltage such as battery 17. Battery 17 is poled to apply a bias voltage in the reverse direction between collector 13 and base 14 and hence, its positive terminal may be grounded while its negative terminal may be connected through collector resistor 16 to collector 13. Battery 17 may be by-passed for alternating-frequency currents by by-pass capacitor 18. A pair of output terminals 20 is connected across collector or load resistor 16; one of the output terminals 20 may be grounded, while the other one may be coupled to collector 13 through coupling capacitor 21.

The transistor circuit described so far is conventional. Usually a bias voltage is applied between emitter 12 and base 14. However, in accordance with the present invention, there need be no direct current connection between emitter 12 and ground. Instead, the emitter 12 is connected to ground through capacitor 23. Accordingly, the transistor circuit of Figure 1 is normally, that is, in its stable conditions, substantially open-circuited and no direct current bias voltage need be applied between emitter 12 and base 14.

A pulse generator 25 which may, for example, develop negative trigger pulses 26 is coupled across base resistor 15. To this end, one terminal of pulse generator 25 may be grounded, while the other one is connected to base 14 through coupling capacitor 27 and a rectifier 28 such as a crystal rectifier connected in series. Crystal rectifier 28 is poled to be rendered conducting upon the arrival of a trigger pulse 26. Hence, if the trigger pulse 26 is of negative polarity, rectifier 28 should be poled to be conducting when the voltage of the junction point between capacitor 27 and rectifier 28 is negative with respect to the voltage of base 14. It is, however, to be understood that rectifier 28 may be omitted. Furthermore, another rectifier 30 such as a crystal rectifier may be connected directly between emitter 12 and base 14. Rectifier 30 should be poled to become conducting when a voltage in the reverse direction exists between emitter 12 and base 14. In other words, the rectifier 30 should be poled to become conducting when the voltage of emitter 12 is negative with respect to that of base 14. It will be understood, however, that rectifier 30 may be omitted because it is not essential to the operation of the circuit of the invention.

Figure 2:
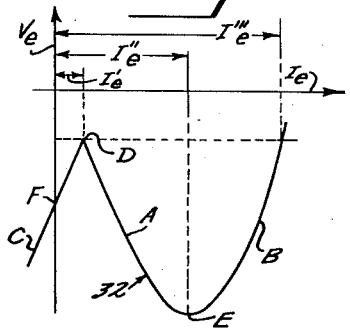
Figure 2 is a graph illustrating the emitter voltage plotted as a function of the emitter current.

The operation of the monostable triggered circuit of Figure 1 may be explained by reference to Figure 2 where the emitter current $I_e$ is plotted against the emitter voltage $V_e$, both being indicated in Figure 1. $V_e$ is taken between emitter and ground. The characteristic curve 32 of Figure 2 essentially resembles the curves shown in the Rack patent above referred to. The characteristic curve 32 has a negative resistance portion A which is bounded on either end by a positive resistance portion B and C, respectively. The points D and E are the boundaries between the positive portion C and the negative portion A and between the negative portion A and the positive portion B respectively of curve 32. The portion of the curve between points D and F (point F corresponding to $I_e=0$) has been exaggerated. The point D corresponds to an emitter current $I_e'$ of approximately 0.05 milliampere and to an emitter voltage $V_e$ of about −1 to −3 volts. However, it will be seen that if the load line of the circuit intersects point F, a stable operation point will be obtained; in accordance with the present invention this is accomplished.

Since the emitter circuit is substantially open-circuited for the stable state of operation, the load line corresponds substantially to infinite resistance and is represented by $I_e=0$, that is, the vertical axis represents the load line which, of course, intersects the point F of curve 32. This stable state of operation corresponds to a state of low collector current with $I_e=0$. At the same time, the emitter voltage $V_e$ has a negative value.

Let it now be assumed that a negative trigger pulse 26 is applied to the circuit of Figure 1. Accordingly, the voltage of base 14 is rendered more negative and consequently, a current $I_e$ flows between capacitor 23, emitter 12 and base 14 in the direction indicated by the arrow in Figure 1. As long as this emitter current is greater than $I_e'$ (as shown in Figure 2), the circuit is triggered into its unstable condition. The emitter current will now further increase. Since we have assumed that transistor 10 is a current-multiplication transistor, the corresponding increase of the collector current will be larger than that of the emitter current. This large collector current flows through base resistor 15 and the resulting voltage drop will drive the base voltage further in the negative direction. Consequently, since the voltage of base 14 is now negative with respect to that of the junction point between capacitor 27 and rectifier 28, the rectifier 28 will cease to conduct and pulse source 25 is effectively disconnected from the monostable transistor circuit.

Due to the higher negative voltage which is now developed at the base 14, a still larger positive current flows through the emitter capacitor 23 into the emitter 12. Consequently, the emitter current which previously had a value greater than $I_e'$ due to the trigger pulse suddenly increases to $I_e'''$ as shown in Figure 2 due to this positive feedback action. After the emitter current has thus suddenly increased to $I_e'''$ it decreases again exponentially because the emitter capacitor 23 is charged. Eventually the emitter current will decrease to a value less than $I_e''$ (Figure 2) and then the circuit rapidly returns again to its stable state of low current conduction (point F on curve 32) because the circuit is unstable within the negative emitter resistance portion A of the curve of Figure 2.

After the circuit of Figure 1 has returned to its stable state of operation, there still remains a negative charge across capacitor 23. In other words, the voltage of emitter 12 is negative with respect to that of base 14. This charge would normally leak off slowly through the resistance which exists between emitter 12 and base 14. This resistance, however, is very high when the emitter is biased in the reverse direction with respect to the base. Consequently, by the provision of rectifier 30 it is possible to discharge capacitor 23 more rapidly. As explained hereinbefore, rectifier 30 becomes conducting when the emitter 12 is negative with respect to the base 14 and this condition prevails after the circuit has returned to its stable condition. Consequently, the circuit is conditioned sooner to receive another trigger pulse and the frequency of the trigger pulses may be increased. However, as explained hereinbefore, the rectifier 30 is not essential to the operation of the circuit of the invention and may, therefore, be omitted.

From the above explanation, it will be evident that the pulse generator 25 forms no part of the charge or discharge path of capacitor 23 and, therefore, the generator 25 may have any desired impedance. By providing a rectifier 28, the generator 25 is effectively disconnected from the triggered circuit until another trigger pulse arrives. Trigger pulses 26 may also be of positive polarity in which case the negative going trailing edge of each trigger pulse will trigger the circuit of Figure 1.

By way of example, the monostable circuit of Figure 1 may have a base resistor 15 of 2,200 ohms and a collector resistor 16 of 5,600 ohms. However, it is also feasible to utilize a collector resistor 16 of very low resistance such as 10 ohms. In a circuit of this type a high current output pulse has been obtained which may have a current as high as one ampere. It has been found that such a high peak current does not damage the transistor over long periods of operation. Of course, the duration or width of the output pulse is of the order of a few microseconds.

Figure 3:
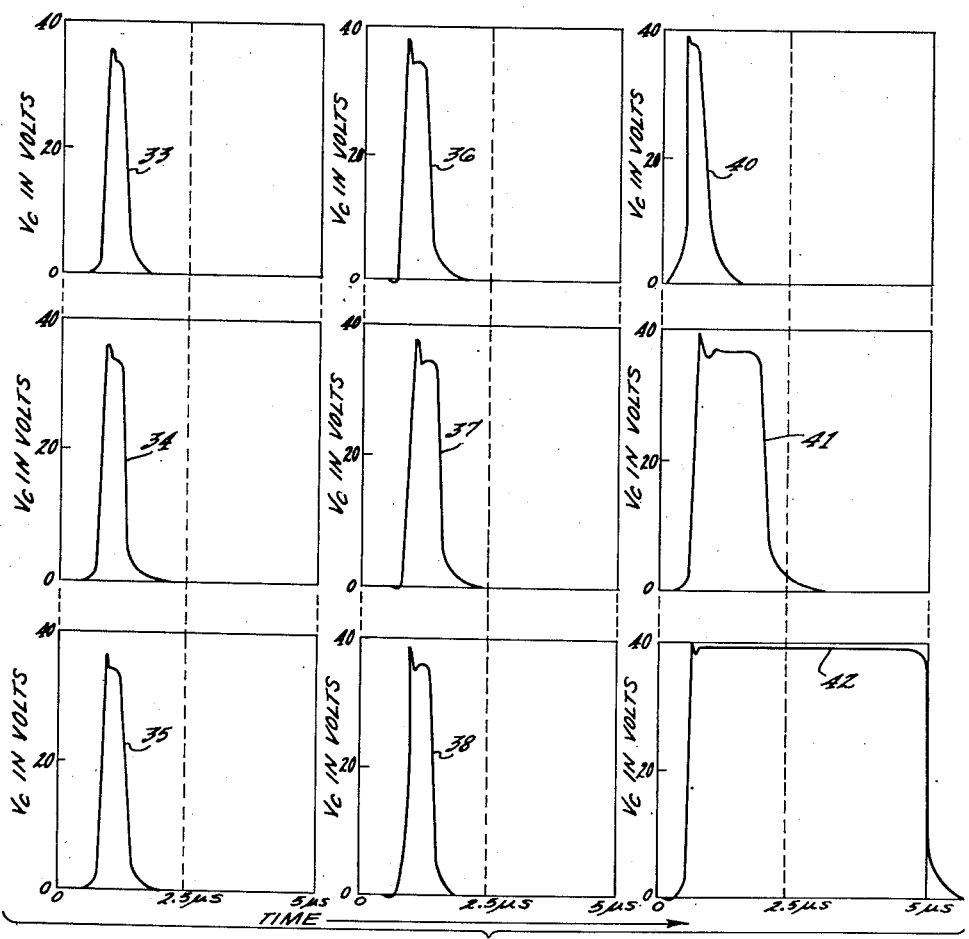
Figure 3 is a graph illustrating output voltage pulses derived from the circuit of Figure 1 under various conditions.

Referring now to Figure 3 there are shown various curves illustrating the collector voltage $V_c$ plotted as a function of time. The first series of curves 33, 34 and 35 was obtained with the circuit of Figure 1 with an amplitude of the trigger pulse of two volts and with a pulse duration of ½, 2 and 5 microseconds respectively. The capacitance of emitter capacitor 23 was 720 micro-microfarads. The next set of curves 36, 37 and 38 was obtained with the same circuit but with an amplitude of the trigger pulse of 20 volts; the pulse duration was again ½, 2 and 5 microseconds respectively. The value of the emitter capacitor 23 was the same as above. Curves 40, 41 and 42 were also obtained with the circuit of Figure 1, but with a capacitance of emitter capacitor 23 of 470, 2,200 micro-microfarads and 0.01 microfarad respectively.

It will be seen from curves 33–38 that the amplitude and duration of the output pulses is substantially independent of the amplitude and duration of the trigger pulses and depends on the capacitance of emitter capacitor 23 as evidenced by curves 40–42.

For the conditions under which curves 40–42 were obtained the output pulse amplitude is of the order of 40 volts, the output pulse rise time 0.02 microsecond and the output pulse fall time 0.1 microsecond. The maximum voltage gain is 80 and the minimum trigger pulse voltage required to trigger the circuit is 0.5 volt. As shown by curves 40–42 the output pulse width is 0.25, 1.1 and 5 microseconds respectively for a capacitance of emitter capacitor 23 of 470, 2,200 micro-microfarads and 0.01 microfarad.

Figure 4:
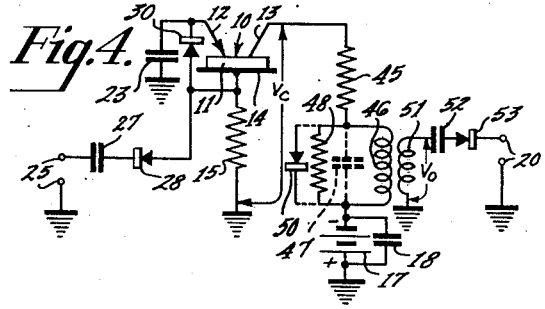
Figure 4 is a circuit diagram of a modified monostable circuit in accordance with the invention which will develop an output pulse that is delayed with respect to the trigger pulse.

Referring now to Figure 4 there is illustrated a modified monostable transistor circuit which makes it possible to derive output pulses which are delayed with respect to the trigger pulses. Except for the collector circuit the triggered circuit of Figure 4 is identical with that of Figure 1. In the collector circuit there is provided a resistor 45 and an inductor 46 connected in series between battery 17 and collector 13. Inductor 46 forms the output load element. Capacitor 47 shown in dotted lines indicates the distributed capacitance of inductor 46. Inductor 46 may be shunted by a resistor 48 to provide damping. Alternatively, a crystal rectifier 50 may be connected across inductor 46 instead of resistor 48.

The output circuit preferably includes inductor 51 inductively coupled to inductor 46. Inductor 51 may have one terminal grounded while its other terminal is connected to one of the output terminals 20 through capacitor 52 and rectifier 53 connected in series.

Figure 5:
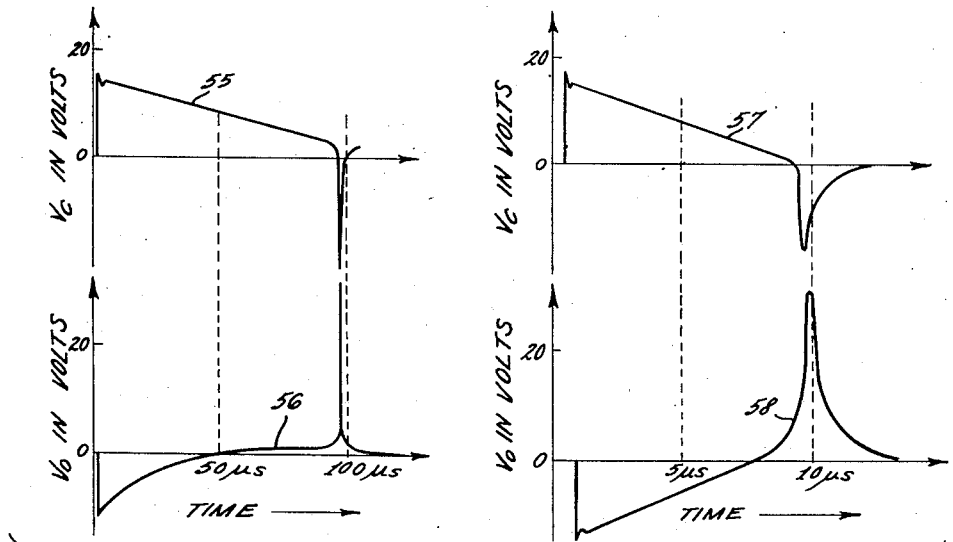
Figure 5 is a graph illustrating voltages plotted with respect to time derived from the circuit of Figure 4 under different conditions.

The circuit of Figure 4 operates in the same manner as does that of Figure 1. Referring now to Figure 5 there are illustrated curves 55 and 56. Curve 55 indicates the collector voltage $V_c$ as a function of time and curve 56 shows the ouput voltage $V_o$ (see Figure 4) as a function of time. The leading edge of curve 55 is developed in response to a trigger pulse and the negative peak of curve 55 corresponds to the instant when the circuit of Figure 4 returns to its stable state, that is, when the collector current is suddenly reduced. The voltage developed across output inductor 51 is shown by curve 56. Inductors 46 and 51 preferably are wound in such a manner that the voltage $V_0$ is reversed with respect to the collector voltage $V_c$ as indicated in Figure 5. Rectifier 53 essentially operates as a clipper to remove or clip off the negative portion of output voltage curve 56. Consequently, a positive voltage peak is developed in response to the trailing edge of the collector voltage curve 55.

Inductor 46 in combination with capacitor 47 forms a resonant circuit which tends to oscillate in response to the sudden changes of the collector current. These oscillations can be damped in any conventional manner, for example, by damping resistor 48. Alternatively, rectifier 50 may be provided which will remove the positive portion of curve 55 by providing a low impedance path for such a voltage. In case rectifier 50 is utilized, the rectifier 53 in the output circuit may be omitted because in that case, only the trailing edge of curve 55 will appear in the output voltage.

Curves 55 and 56 were obtained with the circuit of Figure 4 having an emitter capacitor 23 of 0.25 microfarad. In that case, the time delay of the output pulse with respect to the trigger pulse is almost 100 microseconds. Curves 57 and 58 corresponding respectively to curves 55 and 56 were obtained with an emitter capacitor of 0.01 microfarad. Consequently, the time delay is smaller and is of the order of 10 microseconds. With the circuit of Figure 4 delay times of the output pulse of between ½ and 100 microseconds may be obtained. With a value of the emitter capacitor of 470 micro-microfarads, 0.01 microfarad and 0.25 microfarad respectively, time delays of 0.5, 8.5 and 95 microseconds were obtained with an output pulse amplitude of 10, 35 and 40 volts and with a maximum voltage gain of 20, 70 and 80 respectively, the minimum amplitude of the trigger pulse necessary to initiate a cycle of 0.5 volt in all cases.

Figure 6:
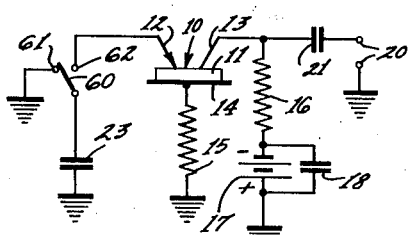
Figure 6 is a circuit diagram of a monostable circuit in accordance with the invention which will develop a single output pulse in response to the closing of a switch.

Referring now to Figure 6 there is illustrated a monostable trigger circuit which will develop a single output pulse when a switch is closed. The circuit of Figure 6 again has a base resistor 15 and a collector resistor 16 across which the output pulse is developed. The emitter circuit is normally open. The emitter capacitor 23 has one terminal connected to ground while its other terminal is connected to the arm 60 of a switch movable between two fixed contacts 61 and 62. Contact 61 is grounded while contact 62 is connected to emitter 12.

With the emitter circuit open, a small collector current flows through base resistor 15 to maintain base 14 at a negative potential. When the switch arm 60 is now moved from the position shown in Figure 6 to contact 62, a positive current flows into the emitter because the emitter is now rendered positive with respect to the base. The base is maintained at a negative potential due to the voltage drop of the collector current across base resistor 15. The circuit of Figure 6 again operates in the manner previously described.

It is also feasible to connect switch contact 61 to the positive terminal of a battery, thereby to provide a trigger pulse of larger amplitude. However, if the resistance of base resistor 15 is sufficiently large, this will not normally be required. The rectifier 30 has been omitted in the circuit of Figure 6.

Figure 7:
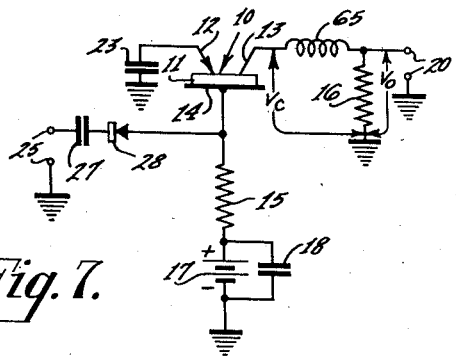

Figure 7 illustrates a monostable circuit which is similar to that of Figure 1. Rectifier 30 has again been omitted and the battery 17 is now connected between base resistor 15 and ground rather than between collector resistor 16 and ground. In this case the negative terminal of battery 17 is grounded to apply a positive voltage to base 14. An inductor 65 may be connected in series between collector resistor 16 and collector 13.

Disregarding inductor 65, the circuit of Figure 7 operates in the same manner as that of Figure 1. However, since battery 17 is now provided between base resistor 15 and ground, it is not necessary to provide a coupling capacitor 21 in the output circuit. In other words, the output voltage does not include the supply voltage. Thus, the circuit of Figure 7 may be desirable for driving direct current circuits or amplifiers. Curve 66 of Figure 10 illustrates the collector voltage pulse as a function of time obtained from the circuit of Figure 7 in the absence of inductor 65.

Figure 8:
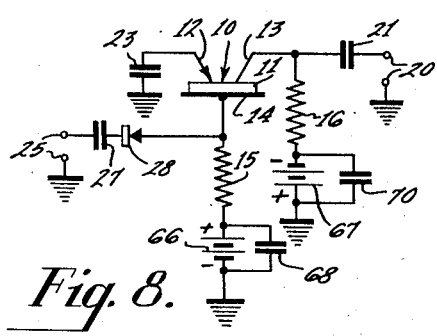

The circuit of Figure 8 is similar to that of Figure 7 except that a battery 66 is connected between base resistor 15 and ground while another battery 67 is connected between collector resistor 16 and ground. Batteries 66 and 67 may be bypassed for alternating-frequency currents by bypass capacitors 68 and 70 respectively. The circuit of Figure 8 makes it possible to adjust the direct current level of the output circuit to any desired value by proper selection of the magnitude of batteries 66 and 67.

The inductor 65 shown in the circuit of Figure 7 has the purpose to modify the wave shape of the output voltage as shown by curve 72 of Figure 10 and illustrating the output voltage $V_0$ as a function of time. It will be observed that the output voltage overshoots on the down swing and eventually becomes negative. The width of the output pulse 72 is now determined both by the capacitance of emitter capacitor 23 and by the inductance of inductor 65.

The circuit of Figure 9 is similar to that of Figure 7 except that the collector inductor 65 has been replaced by an LC network 73 in the emitter circuit. The LC network 73 includes capacitor 23 connected between emitter 12 and ground and a series inductor 74 having its free terminal bypassed to ground by another capacitor 75. This pi network 73 may be considered a portion of a transmission line. The collector voltage wave shape obtained from the circuit of Figure 9 is shown at 76 in Figure 10.

In some monostable circuits discrimination against undesired spurious signals may be more important than the trigger sensitivity. To this end, the emitter may be current biased to insure that the transistor circuit remains in its stable or quiescent state until a trigger pulse exceeding a prescribed amplitude level is applied to the circuit. Such triggered circuits are shown in Figures 11 and 12 and reference is now made to Figure 11. In accordance with Figure 11 a resistor 78 is connected directly between collector 13 and emitter 12. Accordingly, the emitter 12 is maintained at a voltage which is negative with respect to that of base 14. The resistance of resistor 78 preferably is high. Consequently, a negative current flows into the emitter, that is, a current flows from base 14 to emitter 12 as defined by the conventional direction of current flow.

It will be obvious that for the circuit of Figure 11 the load line is no longer given by $I_e=0$ because $I_e$ now has a negative value. Furthermore, there is a definite resistance in the emitter circuit and the load line will intersect the curve portion C of the curve 32 of Figure 2 to the left of point F, and the load line will have a slope corresponding to a positive resistance. It will also be obvious that the trigger pulse must provide a slightly larger current to trigger the circuit past the point D of the curve of Figure 2. Resistor 78, however, has little effect on the operation of the circuit after it has been triggered into its state of high conduction.

A modification of the circuit of Figure 11 is illustrated in Figure 12. Battery 17 is provided between base resistor 15 and ground and a resistor 80 is connected in shunt across emitter capacitor 23. Resistor 80 will again maintain emitter 12 at a potential that is negative with respect to that of base 14 which is maintained at a positive potential. Consequently, the circuit of Figure 12 is again biased by a negative emitter current and its operation is the same as that previously described in connection with Figure 11.

There have thus been disclosed monostable triggered circuits utilizing a current-multiplication transistor. The pulse generator which develops the trigger pulses may be of high impedance and the amplitude and duration of the output pulses is determined essentially by the capacitance of an emitter capacitor and by the magnitude of the collector bias voltage. The output pulses may be delayed with respect to the trigger pulses and the wave shape may be controlled in many ways. It is also feasible to control the direct current level of the output voltage and to discriminate against spurious pulses. The monostable circuits of the invention may be utilized for amplifying and shaping trigger pulses which may have any duration and which need not have a high amplitude.

What is claimed is:

1. A monostable triggered circuit comprising a current-multiplication transistor including a semi-conducting body, a base electrode, an emitter electrode and a collector electrode in contact with said body, an external network interconnecting said electrodes with a common junction point and including a first impedance element connected between said base electrode and said junction point, a second output impedance element connected between said collector electrode and said junction point, a source of voltage connected in series with said first and second impedance elements and poled to apply a voltage in the reverse direction between said collector and base electrodes, capacitive means connected between said emitter electrode and said junction point, whereby the emitter circuit is substantially open-circuited for direct currents, said circuit having a stable state of low current conduction and an instable state of high current conduction, the external emitter circuit being substantially open-circuited during said stable state corresponding to substantially zero emitter current, and means coupled across said first impedance element for applying triggered pulses, whereby the application of a trigger pulse carries said triggered circuit temporarily into said instable state for a period of time determined by the capacitance of said capacitor to develop an output pulse across said second impedance element.

2. A triggered circuit as defined in claim 1 wherein said first impedance element is a resistor.

3. A triggered circuit as defined in claim 1 wherein said second impedance element is a resistor.

4. A triggered circuit as defined in claim 1 wherein said second impedance element includes an inductor.

5. A triggered circuit as defined in claim 1 wherein said source of voltage is connected between said second impedance element and said junction point.

6. A triggered circuit as defined in claim 1 wherein said source of voltage is connected between said first impedance element and said junction point.

7. A triggered circuit as defined in claim 1 wherein said source of voltage has an intermediate point connected to said junction point.

8. A monostable triggered circuit comprising a current-multiplication transistor including a semi-conducting body, a base electrode, an emitter electrode and a collector electrode in contact with said body, an external network interconnecting said electrodes with a common junction point and including a first impedance element connected between said base electrode and said junction point, a second output impedance element connected between said collector electrode and said junction point, a source of voltage connected in series with said first and second impedance elements and poled to apply a voltage in the reverse direction between said collector and base electrodes, a first capacitor connected between said emitter electrode and said junction point, said circuit having a stable state of low current conduction and an instable state of high current conduction, the external emitter circuit being substantially open-circuited during said stable state corresponding to substantially zero emitter current, a first rectifier connected directly between said emitter and base electrodes and poled to be rendered conducting when a reverse bias voltage exists between said emitter and base electrodes, a source of trigger pulses, a second rectifier and a second capacitor connected in series with said source of pulses across said first impedance element, and said second rectifier being poled to be rendered conducting upon arrival of one of the trigger pulses, whereby the application of a trigger pulse carries said triggered circuit temporarily into said instable state for a period of time determined by the capacitance of said capacitor to develop an output pulse across said second impedance element.

9. A monostable triggered circuit comprising a current-multiplication transistor including a semi-conducting body, a base electrode, an emitter electrode and a collector electrode in contact with said body, an external network interconnecting said electrodes with a common junction point and including a first impedance element connected between said base electrode and said junction point, a resistor and an output inductor connected in series between said collector electrode and said junction point, a source of voltage connected in series with said first and second impedance elements and poled to apply a voltage in the reverse direction between said collector and base electrodes, a first capacitor connected between said emitter electrode and said junction point, said circuit having a stable state of low current conduction and an instable state of high current conduction, the external emitter circuit being substantially open-circuited during said stable state corresponding to substantially zero emitter current, a first rectifier connected directly between said emitter and base electrodes and poled to be rendered conducting when a reverse bias voltage exists between said emitter and base electrodes, a source of trigger pulses, a second rectifier and a second capacitor connected in series with said source of pulses across said first impedance element, and said second rectifier being poled to be rendered conducting upon arrival of one of the trigger pulses, whereby the application of a trigger pulse carries said triggered circuit temporarily into said instable state for a period of time determined by the capacitance of said capacitor to develop an output pulse across said output inductor.

10. A triggered circuit as defined in claim 9 wherein means is provided for damping the oscillations set up in said output inductor due to variations of the collector current in response to the arrival of a trigger pulse.

11. A monostable triggered circuit comprising a current-multiplication transistor including a semi-conducting body, a base electrode, an emitter electrode and a collector electrode in contact with said body, a first impedance element connecting said base electrode to a common junction point, a second output impedance element connecting said collector electrode to said junction point, a source of voltage connected serially with said first and second impedance elements for applying a bias voltage in the reverse direction between said collector and base electrodes, a capacitor having one terminal connected to said junction point, and switch means for selectively connecting the other terminal of said capacitor either to said junction point or to said emitter electrode, whereby the emitter circuit is open when said other terminal is connected to said junction point and whereby an output pulse of predetermined width and amplitude is developed across said second impedance element when said other terminal is connected to said emitter electrode.

12. A monostable triggered circuit comprising a current-multiplication transistor including a semi-conducting body, a base electrode, an emitter electrode and a collector electrode in contact with said body, a resistor connecting said base electrode to a common junction point, an output impedance element connecting said collector electrode to said junction point, a source of voltage connected serially with said impedance element between said collector electrode and said junction point for applying a bias voltage in the reverse direction between said collector and base electrodes, a capacitor having one terminal connected to said junction point, and switch means for selectively connecting the other terminal of said capacitor either to said junction point or to said emitter electrode, whereby the emitter circuit is open when said other terminal is connected to said junction point and whereby an output pulse of predetermined width and amplitude is developed across said impedance element when said other terminal is connected to said emitter electrode.

13. A monostable triggered circuit comprising a current-multiplication transistor including a semi-conducting body, a base electrode, an emitter electrode and a collector electrode in contact with said body, an external network interconnecting said electrodes with a common junction point and including a first resistor connected between said base electrode and said junction point, an inductor and a second output resistor connected in series between said collector electrode and said junction point, a source of voltage connected in series with said resistors and poled to apply a voltage in the reverse direction between said collector and base electrodes, a capacitor connected between said emitter electrode and said junction point, and a source of trigger pulses coupled across said first resistor, said circuit having a stable state of low current conduction and an instable state of high current conduction, the external emitter circuit being substantially open-circuited during said stable state corresponding to substantially zero emitter current, whereby the application of a trigger pulse carries said triggered circuit temporarily into said instable state for a period of time determined by the capacitance of said capacitor to develop an output pulse across said output resistor.

14. A monostable triggered circuit comprising a current-multiplication transistor including a semi-conducting body, a base electrode, an emitter electrode and a collector electrode in contact with said body, an external network interconnecting said electrodes with a common junction point and including a resistor connected between said base electrode and said junction point, an output impedance element connected between said collector electrode and said junction point, a source of voltage connected in series with said resistor and said impedance element and poled to apply a voltage in the reverse direction between said collector and base electrodes, an LC network including a first capacitor connected between said emitter electrode and said junction point, said LC network including an inductor and a second capacitor connected across said first capacitor, and a source of trigger pulses coupled across said resistor, said circuit having a stable state of low current conduction and an instable state of high current conduction, the external emitter circuit being substantially open-circuited during said stable state corresponding to substantially zero emitter current, whereby the application of a trigger pulse carries said triggered circuit temporarily into said instable state for a period of time determined by the capacitance of said capacitor to develop an output pulse across said output impedance element.

15. A monostable triggered circuit comprising a current multiplication transistor including a semi-conducting body, a base electrode, an emitter electrode and a collector electrode in contact with said body, an external network interconnecting said electrodes with a common junction point and including a first resistor connected between said base electrode and said junction point, an output impedance element connected between said collector electrode and said junction point, a source of voltage connected in series with said resistor and said impedance element and poled to apply a voltage in the reverse direction between said collector and base electrodes, a capacitor connected between said emitter electrode and said junction point, a source of trigger pulses coupled across said first resistor, said circuit having a stable state of low current conduction and an instable state of high current conduction, and means including a second resistor connected to said emitter electrode for applying to said emitter electrode during said stable state of conduction a voltage to bias said emitter electrode in the reverse direction with respect to said base electrode.

16. A monostable triggered circuit comprising a current-multiplication transistor including a semi-conducting body, a base electrode, an emitter electrode and a collector electrode in contact with said body, an external network interconnecting said electrodes with a common junction point and including a first resistor connected between said base electrode and said junction point, an output impedance element connected between said collector electrode and said junction point, a source of voltage connected in series with said impedance element between said collector electrode and said junction point and poled to apply a voltage in the reverse direction between said collector and base electrodes, a capacitor connected between said emitter electrode and said junction point, said circuit having a stable state of low current conduction and an instable state of high current conduction, a source of trigger pulses coupled across said first resistor, and a second resistor connected directly between said collector and emitter electrodes for biasing said emitter electrode in the reverse direction with respect to said base electrode during said stable state of conduction.

17. A monostable triggered circuit comprising a current-multiplication transistor including a semi-conducting body, a base electrode, an emitter electrode and a collector electrode in contact with said body, an external network interconnecting said electrodes with a common junction point and including a first resistor connected between said base electrode and said junction point, an output impedance element connected between said collector electrode and said junction point, a source of voltage connected in series with said first resistor between said base electrode and said junction point and poled to apply a voltage in the reverse direction between said collector and base electrodes, a capacitor connected between said emitter electrode and said junction point, said circuit having a stable state of low current conduction and an instable state of high current conduction, a source of trigger pulses coupled across said first resistor, and a second resistor connected across said capacitor for biasing said emitter electrode in the reverse direction with respect to said base electrode during said stable state of conduction.

18. A triggered circuit as defined in claim 16 wherein the resistance of said second resistor is relatively high.

19. A triggered circuit as defined in claim 17 wherein the resistance of said second resistor is relatively high.

ARTHUR W. LO.

No references cited.